Feb. 11, 1947. A. E. LANDERHOLM 2,415,640
ELECTROSTATIC MACHINE
Filed Feb. 20, 1945
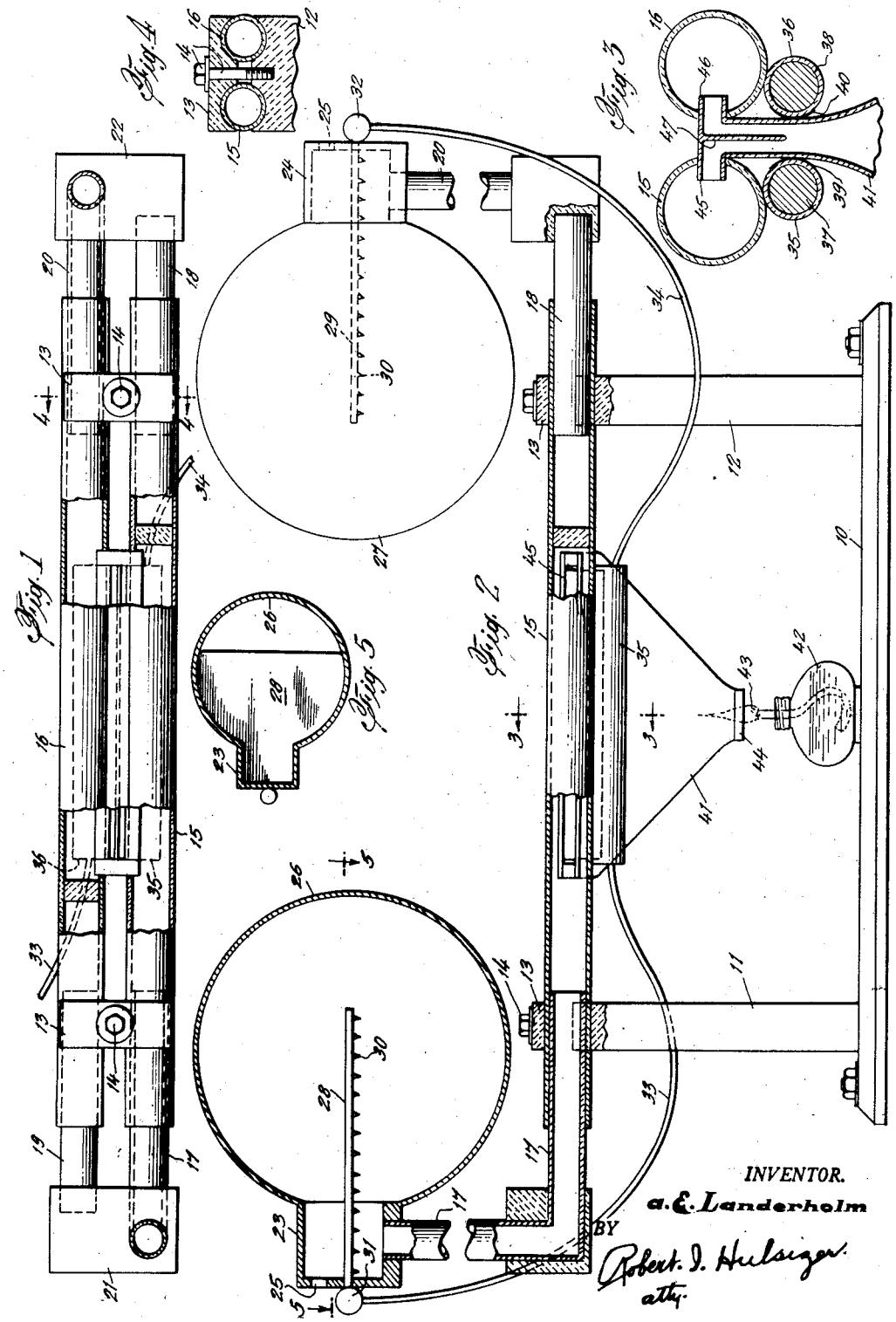
INVENTOR.
a. E. Landerholm
BY
Robert I. Hulsizer
atty.

100# UNITED STATES PATENT OFFICE 2,415,640

ELECTROSTATIC MACHINE

Axel E. Landerholm, Brooklyn, N. Y.

Application February 20, 1945, Serial No. 578,882

3 Claims. (Cl. 171—329)

This invention relates to new and useful improvements in electrostatic machines or generators.

The object of the invention is to provide a simple, efficient, and economical device for the generation of charges of static electricity from streams of gas passing a flame source or an incandescent source.

A further object is to separate said charges and for collecting them and storing them so as to build up high potential charges in a useful and available form.

Further and more specific objects, features, and advantages will more clearly appear from a consideration of the specification hereinafter especially when taken in connection with the accompanying drawing which forms part of the specification and which illustrates a present preferred form which the invention may assume.

When gases are passed through or near a flame source or an incandescent source, a great abundance of ions are produced. Therefore gases in and surrounding flames contain vast numbers of ions. These ions are susceptible of being attracted and repelled by suitable electrical forces such as an electric field. In a body of air containing ions, an electric field sets up two streams of charged particles (ions) which are pulled or which drift in opposite directions. If a flame is held a few inches above a charged electroscope, the ions will, even by the influence of that feeble field, be attracted down out of the flame. A positive charge on the electroscope will pull down negative ions and conversely.

The gases which come from a flame remain ionized for a considerable time, and, even when completely cooled, to such an extent that in delicate electrical measurements precaution must be taken to avoid the presence of flame in the room.

This ionization can be completely taken out of a gas by passing the gas through a strong electric field.

Broadly and generally speaking, the device which I have provided comprises a source of flame or an incandescent source, in combination with a conduit preferably a fish tail shaped conduit into which the flame source is introduced and the current of air is passed up and around the flame source and through the conduit as a thin wide sheet of heated ionized gas. Adjacent the upper end of this conduit are disposed on opposite sides thereof two induction bodies suitably charged and adapted to attract ions of opposite polarity and draw them toward the opposite walls of the conduit. A septum is disposed at the upper end of the conduit to cause the physical separation of the stream into two parts, one containing the positively charged ions and the other containing the negatively charged ions. These separate streams of charged gases are then lead through suitable pipes to storage chambers in the form of metal spheres where the charges are released from the gas and the gas passes out of the system. The charges are collected on a plate within each metal sphere, and each sphere is connected to a respective inductor body disposed adjacent the moving stream of charged gas as previously mentioned.

The particular form of the invention shown in the drawing is illustrated in the figures thereof of which, Fig. 1 is a plan view of the device, with parts broken away;

Fig. 2 is a vertical side elevation of the device;

Fig. 3 is a vertical cross section taken on the line 3—3 of Fig. 2;

Fig. 4 is a vertical transverse section taken on the line 4—4 of Fig. 1; and,

Fig. 5 is a horizontal cross section taken on the line 5—5 of Fig. 2.

As shown in the drawing, the actual form of device representing the preferred form only of the invention comprises a base 10, pedestal members 11 and 12 having at their tops adjustable clamp elements 13 with set screws 14 to hold in spaced parallel relation pipes 15 and 16 of refractory and insulating material. The ends of these pipes are open and are adapted to be closed as follows:

The pipe 15 at its left end receives an elbow-pipe 17 and at its right end receives a sliding block 18. The pipe 16 at its right end receives the sliding elbow-pipe 20 and at its left end the sliding block 19. The pipe 17 and block 19 are embedded or disposed in a refractory block 21 and the pipe 20 and the sliding block 18 are suitably disposed in refractory block 22. These pipes and blocks can be adjusted within the conduits 15 and 16 as desired. The upper ends of pipes 17 and 20 are respectively connected to metallic casing 23 and 24 having openings 25 therein and supporting the metal spheres or collectors 26 and 27.

The spheres respectively contain baffle plates 28 and 29 which extend well into them and divide them into upper and lower portions. The spheres receive the charges which are carried up into them by the heated gases and they are collected on the lower portions of the plates 28 and 29 by means of points 30. The casings 23 and 24 are connected respectively by wires 33 and 34 to inductors 37 and 38 which are disposed as shown along opposite sides and at the upper end of the fish tail conduit 41. The inductors are enclosed in insulating cylinders 35 and 36. The wires 33 and 34 are connected at their upper ends to metallic balls 31 and 32 connected to the metallic casings 23 and 24. Conducting plates 39 and 40 are disposed respectviely between the cylinders 35 and 36 and the adjacent walls of the conduit 41. These plates are priming plates which, when desired, may be connected to a suitable source of potential (not shown) to start the action of the field across the stream of gas passing up within the conduit.

The lower end of the fish-tail conduit 41 has a circular opening 44 and through this the gas enters in proximity to an incandescent source such as a flame source 43 from an alcohol lamp 42 disposed on the base 10. The upper end of the fish-tail conduit is provided with oppositely extending openings or passage-ways 45 and 46 leading into the pipes 15 and 16 respectively. A barrier or septum 47 extends downwardly from the upper end of the conduit 41 to divide the upper portion thereof into two spaced paths leading respectively to the openings 45 and 46.

In the operation of this simple generator, the fish-tail conduit 41 receives the gases which have entered the opening 44 and been ionized by the incandescent source or a flame source such as the flame 43. This conduit is formed to spread out the gases thus received into a thin wide sheet. Its form permits the inductors 37 and 38 to be placed close together so that they give a wide and strong electric field across the space within the conduit 41. The electric force in this field causes a migration of ions in opposite directions, and the septum 47 thus physically maintains the separation of the ionic streams brought about in the first instance by the electrostatic field across between the inductors 37 and 38. Thus the ions in the gases are separated and carried upwardly to separate spheres and there collected.

The rising charged gases enter the pipes or ducts and pass to the hollow sphere terminals and there the charges are given up. The needle points 30 lining the baffle plates within the sphere terminals cause the charges to drain out of the gases and be deposited on the terminals and the gases thereafter pass out by way of the openings 25.

The terminals by wires 33 and 34 are electrically connected to the inductors 37 and 38. The deposited charges seek to get back together; and since the closest approach is by way of the closely placed inductors, a strong field appears in this region.

The ions of the gas stream above the flame source or the incandescent source are in part driven to the wall by the electrical forces and are held bound there. These bound ions tend to diminish and check the power of the electric field across the space. The ions which pass by, on the other hand, augment the charges on the terminals, progressively building up the potential, and these in turn augment the electric field in the space between the inductors. These ions which get past the inductors and are entrained within the ducts form the continuous reserve which feed the terminals and maintain the inductors' strength always a step ahead of the effect of the captured ions and make for a continuous self-sustained action without any auxiliary excitation of the inductors except for the initial priming.

The neutralizing effect of the captured ions acts to moderate the strength of the inductors. This is desirable, since excessive strength of the inductors would abstract all the ions from the gases and so stop further action forthwith.

The captured ions are only temporarily sidetracked for when a discharge between the terminals takes place, with the consequent drop in the field strength, the captured ions are liberated and swarm away into the gas stream, which moves to initiate fresh charges on the terminals or to replenish residual charges there.

It is well to have the gas carrying ducts of sufficient length and capacity so that when a discharge occurs between the spheres enough ions are in transit to start prompt strong action anew.

While the invention has been described in detail herein as to a present preferred form thereof, it is clearly to be understood that many changes and modifications may be made in the construction without departing from the spirit and scope of the invention set forth, and it is not intended therefore to limit the invention to the particular form shown but only in so far as it may be limited by the scope of any one or more of the appended claims.

What I claim as my invention is:

1. In an electro-static generator, the combination of an incandescent source or a flame source, a conduit associated therewith through which gases pass in close proximity to the source, means associated with said conduit and spaced from the source to establish an electric field across said conduit to separate the ions in the stream of gases therein, a septum plate in the conduit subsequent to the point of separation of the ions to maintain their physical separation thereafter, hollow terminals, and conduits connecting the terminals with the conduit to receive the separated ions carried in the gases.

2. In an electro-static generator, the combination of an incandescent source or a flame source, a conduit associated therewith through which gases pass in close proximity to the source, means asscciated with said conduit and spaced from the source to establish an electric field across said conduit to separate the ions in the stream of gases therein, a septum plate in the conduit subsequent to the point of separation of the ions to maintain their physical separation thereafter, hollow terminals, conduits connecting the terminals with the conduit to receive the separated ions carried in the gases, means within the terminals to collect ions, said terminals being connected to the means to establish an electric field across the conduit.

3. In an electro-static generator, the combination of an incandescent source or a flame source, a conduit associated therewith and through which pass gases in close proximity to the source, a pair of pipes disposed near the end of the conduit, said conduit having passages connecting into each pipe, a septum in the conduit at the end thereof to divide the gases passing into one pipe from those passing into the other, and means prior to the septum and disposed in association with the conduit to create an electric field across the conduit to cause the ions in the gaseous stream to move to opposite sides of the conduit, hollow terminals, the pair of pipes connected respectively to said terminals, baffle plates in the terminals to deflect the passing of the gases and to collect the ions thereon, and wires connecting the terminals with the respective means for creating an electric field across the conduit.

AXEL E. LANDERHOLM.

REFERENCES CITED

The following references are of record in the file of this patent:

UNITED STATES PATENTS

| Number | Name | Date |
|---|---|---|
| 1,443,091 | Petersen | Jan. 23, 1923 |
| 1,964,738 | McCreary | July 3, 1934 |
| 2,210,918 | Karlowitz et al. | Aug. 13, 1940 |
| 2,004,352 | Simon | June 11, 1935 |
| 2,208,217 | Landerholm | July 16, 1940 |